United States Patent
Bastian et al.

(10) Patent No.: US 7,167,787 B2
(45) Date of Patent: Jan. 23, 2007

(54) METHOD FOR CONTROLLING THE SPEED OF A MOTOR VEHICLE IN ACCORDANCE WITH RISK AND SYSTEM FOR CARRYING OUT THE METHOD

(76) Inventors: Dieter Bastian, Hafenstrasse 11, 19055 Schwerin (DE); Ralf Eisenreich, Agricola-Strasse 14, 09559 Freiberg (DE)

( * ) Notice: Subject to any disclaimer, the term of this patent is extended or adjusted under 35 U.S.C. 154(b) by 0 days.

(21) Appl. No.: 11/236,538

(22) Filed: Sep. 28, 2005

(65) Prior Publication Data

US 2006/0052929 A1 Mar. 9, 2006

Related U.S. Application Data

(63) Continuation of application No. PCT/DE04/00618, filed on Mar. 24, 2004.

(30) Foreign Application Priority Data

Mar. 28, 2003 (DE) ................ 103 14 119

(51) Int. Cl.
*G01C 21/34* (2006.01)

(52) U.S. Cl. ............. 701/93; 701/209; 701/210; 701/117; 701/118; 701/25; 180/168

(58) Field of Classification Search ......... 701/93, 701/202, 110, 117, 25, 209, 210, 118; 101/121, 101/123; 180/168; B60T 8/32
See application file for complete search history.

(56) References Cited

U.S. PATENT DOCUMENTS 2,908,902 A * 10/1959 Gray et al. ............ 701/217
4,043,607 A * 8/1977 Signorelli et al. ......... 303/112
4,354,097 A * 10/1982 Menager .................. 235/96
4,361,202 A * 11/1982 Minovitch ............... 180/168
4,371,934 A * 2/1983 Wahl et al. ............. 455/456.1
5,487,002 A * 1/1996 Diller et al. ............... 701/1
5,553,007 A * 9/1996 Brisson .................. 702/182

(Continued)

FOREIGN PATENT DOCUMENTS

DE 41 23 110 1/1992

(Continued)

OTHER PUBLICATIONS

Schumacher et al., Field Oriented Control of Induction Motor Without Speed Sensor With Control and Correction For the Flux Angle, PCIM 97, Proc. of the 31st Inter. Intelligent Motion Conf., Jun. 10, 1997 (from Dialog(R) File 95, acc no. 01152752 E97091131040).*

(Continued)

*Primary Examiner*—Cuong Nguyen
(74) *Attorney, Agent, or Firm*—Walter Ottesen

(57) ABSTRACT

A method controls the speed of a motor vehicle in accordance with risk. Each risk element of a road segment is evaluated for the specific risk potential thereof by taking into consideration the perils and the actual speed of the driver of the motor vehicle. An integral risk potential is calculated for the road segment on the basis of the sum of the specific risk potentials of all detected risk elements. A system is provided to carry out the method of the invention.

14 Claims, 1 Drawing Sheet

U.S. PATENT DOCUMENTS

| | | | |
|---|---|---|---|
| 5,627,752 A * | 5/1997 | Buck et al. | 701/35 |
| 5,736,940 A * | 4/1998 | Burgener | 340/994 |
| 5,748,476 A | 5/1998 | Sekine et al. | |
| 5,828,979 A * | 10/1998 | Polivka et al. | 701/117 |
| 6,054,936 A | 4/2000 | Yamagata et al. | |
| 6,098,048 A * | 8/2000 | Dashefsky et al. | 705/10 |
| 6,249,724 B1 * | 6/2001 | McCrary | 701/24 |
| 6,498,976 B1 * | 12/2002 | Ehlbeck et al. | 701/70 |
| 6,560,532 B2 * | 5/2003 | Cayford | 701/209 |
| 6,603,405 B2 * | 8/2003 | Smith | 340/905 |
| 6,754,485 B1 * | 6/2004 | Obradovich et al. | 455/414.1 |
| 6,777,659 B1 | 8/2004 | Schwarte | |
| 6,810,817 B1 * | 11/2004 | James | 104/88.04 |
| 6,832,141 B2 * | 12/2004 | Skeen et al. | 701/35 |
| 6,926,374 B2 | 8/2005 | Dudeck et al. | |
| 6,931,309 B2 * | 8/2005 | Phelan et al. | 701/1 |
| 6,974,414 B2 * | 12/2005 | Victor | 600/300 |
| 2002/0177947 A1 * | 11/2002 | Cayford | 701/209 |
| 2002/0186144 A1 * | 12/2002 | Meunier | 340/825.28 |
| 2003/0083813 A1 * | 5/2003 | Park | 701/210 |
| 2003/0135304 A1 * | 7/2003 | Sroub et al. | 701/1 |
| 2003/0181822 A1 * | 9/2003 | Victor | 600/558 |
| 2004/0083041 A1 * | 4/2004 | Skeen et al. | 701/35 |
| 2005/0030184 A1 * | 2/2005 | Victor | 340/576 |
| 2005/0096809 A1 * | 5/2005 | Skeen et al. | 701/29 |
| 2006/0052929 A1 * | 3/2006 | Bastian et al. | 701/93 |
| 2006/0155439 A1 * | 7/2006 | Slawinski et al. | 701/35 |

FOREIGN PATENT DOCUMENTS

| | | |
|---|---|---|
| DE | 43 38 244 | 5/1994 |
| DE | 195 01 950 | 8/1995 |
| DE | 44 37 365 | 5/1996 |
| DE | 196 38 511 | 3/1998 |
| DE | 197 00 353 | 7/1998 |
| DE | 197 45 166 | 4/1999 |
| DE | 199 16 123 | 3/2001 |
| DE | 101 63 990 | 6/2002 |
| DE | 101 03 767 | 9/2002 |

OTHER PUBLICATIONS

Unknown author, The remote control becomes a communication center, Volvo Cars—Press Release, Jan. 8, 2001, (from Dialog® File 81, acc. No. 160146).*

Unknown author, Army Ground-Accident Report, Countermeasure, vol. 17 No. 11, Army Safety Center, Fort Rucker, AL. Nov. 1996 (from Diialog(R) File 6, acc. No 1991656).*

Jeff Johnston, Good driving habits can be an effective aid in reducing travel costs, Trailer Life, Sep. 1, 2001 (from Internet's Yahoo).*

Ogle et al., Accuracy of GPS for determining driver performance parameter, Transportation Research Record n 1818 2002 (from Dialog(R) File 8, acc No. 06365690).*

Michael J Kelly et al., Driver performance while using a cellular telephone inerface to a traveler information system, Jul. 29, 2005 (from Dialog(R) File 63, acc. No. 01024630).*

T. Litman, Safe travels: evaluating mobility management traffic safety impacts, Victoria Transport PolicyInstitute, Oct. 27, 2004 (from Dialog(R) File 63, acc. No. 00981865).*

Metzler, H.G., "How far can the computer replace the driver in Automatic Driving", Vehicle Control, 4514 Automotive Engineer, 20 (1995), Oct./Nov., No. 5, Bury St., Edmonds, Great Britain, pp. 18 to 20.

* cited by examiner

METHOD FOR CONTROLLING THE SPEED OF A MOTOR VEHICLE IN ACCORDANCE WITH RISK AND SYSTEM FOR CARRYING OUT THE METHOD

CROSS REFERENCE TO RELATED APPLICATIONS

This is a continuation of international patent application PCT/DE 2004/000618, filed Mar. 24, 2004, and claiming priority from German patent application no. 103 14 119.7, filed Mar. 28, 2003, and the entire content of both applications is incorporated herein by reference.

FIELD OF THE INVENTION

The invention relates to a method for determining the risk potential which is integrated from the totality of all accident risks and matches the manner of driving to this risk potential. The invention also relates to a system for carrying out the method of the invention.

BACKGROUND OF THE INVENTION

Methods and systems of the above kind are primarily used in the area of road traffic.

The situation and the trend in road traffic are characterized in that more motor vehicles are licensed from year to year than are taken out of service. This leads to an ever greater traffic density which, in turn, imposes higher requirements on the operator of a motor vehicle.

The accident statistics show an ever increasing number of traffic accidents with significant human loss as well as health and material damage even though the severe and fatal injuries become less as a consequence of improved safety comfort of the vehicles.

From the state of the art, it can be seen that attempts are made to facilitate for the vehicle operator the realization of risk elements which hinder road traffic. Accordingly, a series of technical apparatus have become known wherein the application of the most different sensors is shown for the detection of obstacles in the vicinity of the motor vehicle and other dangers for traffic safety. Sensors are described, inter alia, in U.S. Pat. Nos. 6,926,374 and 6,054,936 and German patent publications 101 03 767 A1 and 195 01 950 A1 which not only detect individual obstructions but look at the entire vicinity of the vehicle and differentiate between stationary and mobile obstacles on the one hand and persons, which are moving, on the other hand, and which are to be avoided.

These sensors include also detectors having photonic mixer diodes as they are described in U.S. Pat. No 6,777,659 and German patent publication 199 16 123.

A universal system of communication, information and navigation is disclosed in German patent publication 101 63 990. This system uses mobile parts, central servers and the most various methods of satellite navigation and of mobile communications in order to announce and to avoid multiple dangers.

An arrangement for controlling the speed of a motor vehicle is described in German patent publication 41 23 110. This arrangement determines the factors which influence vehicle speed (such as driver command, distance to a forward vehicle, traction of the roadway and speed or the like) and, from these factors, the arrangement determines an individually permissible maximimum speed.

German patent publication 197 00 353 discloses an arrangement for diagnosing, controlling, transmitting and storing safety relevant system state variables. This arrangement evaluates and qualifies sensor-determined state variables and generates control operations when there are safety-critical deviations to a desired state.

In addition, German patent publication 43 38 244 describes a danger-avoidance system for a vehicle wherein the state of the motor vehicle, the vicinity of the roadway and the operator are monitored. From the data obtained in this way, the danger potential is evaluated and a corresponding control signal is generated when there is a specific danger situation.

Finally, German patent publication 197 45 166 describes a method for monitoring the safety of a motor vehicle wherein first the instantaneous position is determined from a digitally stored map and an intended roadway is selected. Thereafter, all dangerous locations, which are along this roadway, are localized and an automatic braking is triggered when the instantaneous speed exceeds a critical speed for the particular danger location and the instantaneous distance to this danger site.

A method for controlling the speed of a motor vehicle with respect to risk is described in the article entitled "How far can the computer replace the Driver in Automatic Driving", Automotive Engineer, GB, Vol. 20, No. 5, Oct. 1, 1995, pages 18 to 20. In this method, the instantaneous speed is measured and risk elements are determined during travel from which an integral risk potential is computed. This integral risk potential then functions as the basis for a change of the speed. This method, however, does not consider the interrelationships of element quantity and speed moderated specific dangers of the risk elements as the two components of the integral risk potential and is therefore unsuitable for an effective application.

German patent publication 197 00 353 describes an arrangement for diagnosing, controlling, transmitting and storing safety-relevant system state quantities of a motor vehicle. In this method, the following are utilized: sensors for detecting risk elements, a display and a risk decoder for processing information quantities. For this purpose, the risk decoder is also connected to a speed sensor. However, this arrangement too does not consider or considers only inadequately the two components of the risk potential and therefore functions inaccurately.

All of the above methods and arrangements proceed from the consideration that operating disturbances of modern vehicle technology (insofar as they can not be independently controlled) are automatically displayed so that the risk potential is dependent decisively upon perception losses of the driver of the motor vehicle as to the permanent and temporary risk elements of the traffic environment. This consideration corresponds to the basic recognition of the perception theory which states that the vehicle driver perceives approximately 90% of his information visually of which 40 to 50% are only incompletely or defectively interpreted under controlled conditions. Correspondingly, all known technical arrangements are directed to the improvement of the information for the operator of the motor vehicle.

Recent investigations show, however, that the perception losses and therefore also the risk potential increase not only with the number of risk elements of the external milieu and therefore with the quantity of information. The risk potential increases with the specific dangerousness of the permanent and temporary elements of the external milieu which, in turn, are dependent upon the speed and upon the typical traffic situation. Here, however, not only the speed itself is significant. Traffic modules and town-conditions modules of the infrastructure also have a considerable influence. Accordingly, exceeding the permissible speed of 30 km/h can be associated with consequences to the same extent as exceeding a permissible speed of 100 km/h.

This realization is not taken into account by any of the known technical systems so that these technical systems are not suitable to significantly reduce the occurrence of traffic accidents.

SUMMARY OF THE INVENTION

It is an object of the invention to provide a method for determining a risk potential, which is integrated from the totality of all accident risks, and to match the manner of driving to this risk potential. It is also an object of the invention to provide a system for carrying out this method.

The method of the invention is for controlling the speed of a vehicle in accordance with risk. The method includes the steps of: computing a pregiven trip route for the vehicle which includes a plurality of speed-dependent trip segments; detecting the instantaneous speed of the vehicle; detecting risk elements during the trip for each one of the trip segments; computing the current one of the speed-dependent trip segments from the trip route; evaluating each one of the determined risk elements of the one speed-dependent trip segment as to the specific risk potential of the one risk element while considering the dangers thereof and the instantaneous speed of the vehicle; computing an integral risk potential for the one speed-dependent trip segment from a sum of the specific risk potentials of all of the detected risk elements for the one speed-dependent trip segment; and, utilizing the integral risk potential as a basis for changing the speed of the vehicle.

The method of the invention and the system of the invention proceed from the recognition that a qualitative or quantitative improvement of the perception of risk elements of the environment do not automatically lead to a reduction of traffic accidents because, in critical situations, the vehicle operator is overwhelmed and therefore can not specifically convert the traffic information into a rational decision.

The method of the invention further proceeds from the realization of an inherent analysis of 35,128 government registered road traffic accidents in representative territorial regions of North Germany according to which 19 different risk elements from the external milieu of the traffic system and the environment are responsible for these road traffic accidents of which up to 9 risk elements occur simultaneously. These risk elements of the external milieu include such permanent elements as curves, uphill inclines, exits, trees, poles, posted dangerous key points, local accident key points, roadway defects, construction sites, other obstructions as well as wild animal crossovers and right of way signs.

These risk elements of the external milieu also include such temporary elements as darkness, wetness, slipperiness, wind, fog, pedestrians and bicycle riders, motorcycles, oncoming vehicles and vehicles traveling in the same direction.

The method of the invention further proceeds from the realization of the analysis according to which each risk element has a specific risk potential and this specific risk potential increases with the interaction with other ones of the above-mentioned risk elements and with increasing speed of the vehicle. From the view of the severity of the traffic accident, risk elements of the external milieu form to define clusters whose potential is characterized by nine score points. The possible speeds of the vehicle can be subdivided, for example, into three different speed classes. These speed classes are: first, start-to-drive, turning, stopping and parking at the lowest speed possible; second, driving at a permitted speed; and, third, driving at an impermissible speed. These three speed classes can be further subdivided with the aid of element quantities.

For each risk element of the external milieu, a specific risk potential can be determined from: the permanent and temporary risk elements of the external milieu which are determined from the analysis; the score points which are determined from the element combinations; and, the three speed classes. The mutual dependency of these parameters is configured as an accident-statistic standard matrix and forms the basis of the determination of an integral risk potential. This integral risk potential is then expressed in risk classes from one to, for example, five with the significance of very low, low, average, high and very high.

The method of the invention also proceeds from the realization of the analysis that, in addition to the above-mentioned 19 permanent and temporary elements of the external milieu, traffic accidents are also influenced by individual risk elements of the driver of the vehicle. These include especially driving with a learner's permit or the psychosomatic state of the driver of the vehicle. These individual risk elements therefore flow likewise into the determination of the integral risk potential. To include additional influences such as the driver's age and the driver's sex is rather questionable in view of the investigation of 35,128 traffic accidents of all degrees of severity.

BRIEF DESCRIPTION OF THE DRAWING

The invention will now be described with reference to the single FIGURE of the drawing (FIG. 1) which is a schematic showing the system of the invention for carrying out a method of controlling the speed of a motor vehicle with respect to risk.

DESCRIPTION OF THE PREFERRED EMBODIMENTS OF THE INVENTION

Figure 1:
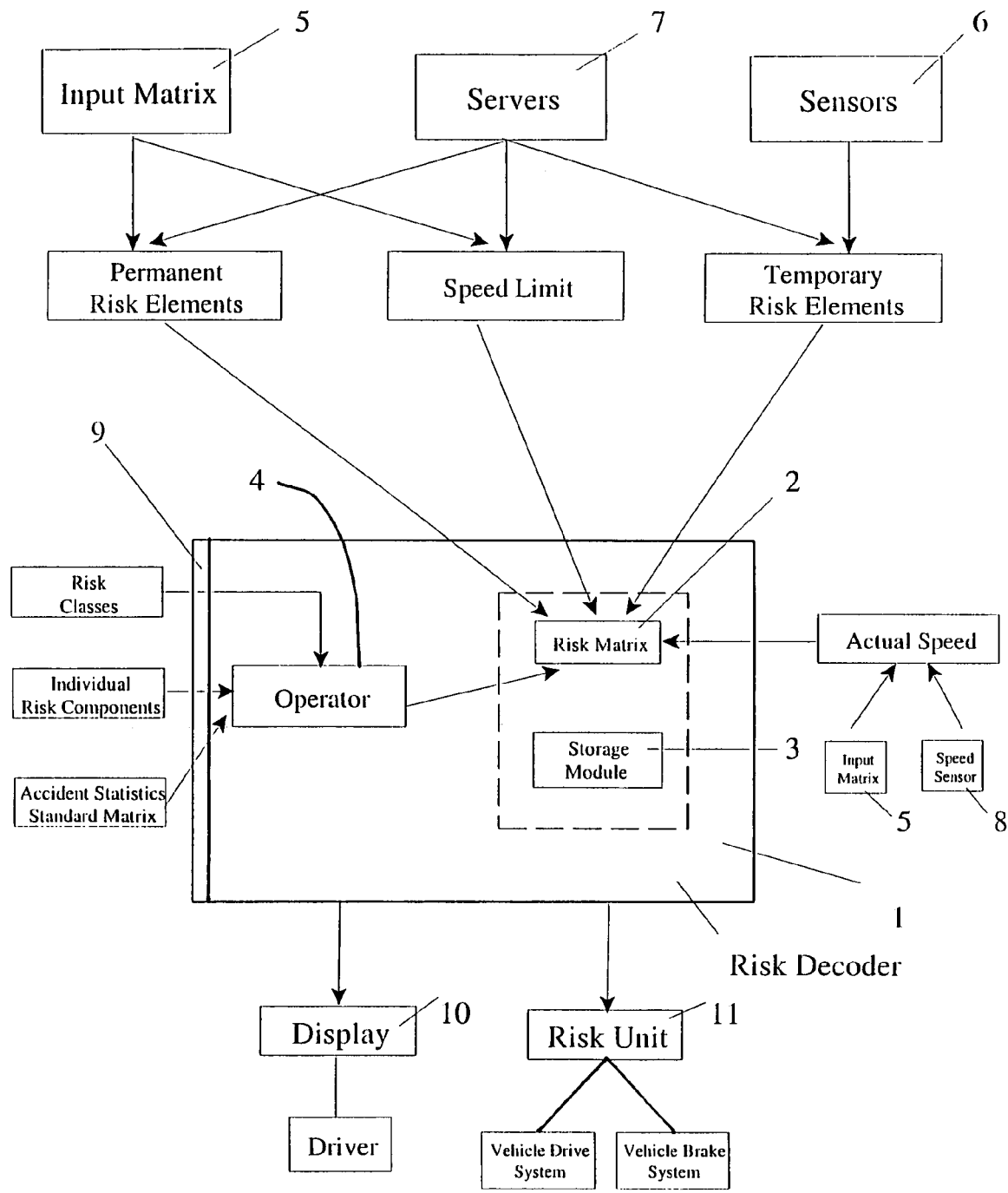

The system shown in FIG. 1 includes a risk decoder 1. This risk decoder 1 includes a risk matrix 2 for receiving and coding quantities of information. The risk decoder 1 further includes a storage module 3 for storing selected quantities of information for a limited time or permanently and an operator 4 into which information is inputted manually. To transmit this information further, the operator 4 is connected to the risk matrix 2. A functional connection for the mutual exchange of information is present between the storage module 3 and the risk matrix 2. The risk decoder 1 is equipped with an operating system for processing the information.

The risk decoder 1 is an apparatus which is fixedly mounted in the vehicle or is connected to the vehicle via a holder and is additionally connected to a built-in autonavigation system or to a conventional pocket PC.

At the input end, the risk decoder 1 is connected to an input matrix 5 which is designed as an overlay of a conventional GPS-coded topographical map which can serve the satellite-controlled navigation of the vehicle with respect to software with the aid of a pocket PC. In the same manner, the input matrix 5 can be designed as an overlay of a satellite navigation system fixedly mounted in the vehicle. Into this overlay, the permanent risk elements and the speed limits of a roadway are inputted with the aid of a corresponding menu of a conventional software program. During the travel operation, the input matrix 5 makes available the permanent risk elements and the speed limits to the risk matrix 2. For planning a trip, the input matrix 5 can be used by the driver in that the driver can input additionally risk factors pertaining to the travel path and known to the driver via the corresponding program menu and can again delete the same, as required, even during the trip. The permanent risk elements and the speed limits, which originally belong to the program, are write protected so that they cannot be changed by the driver or by a third person for reasons of safety.

The risk decoder 1 is connected at the input end to a package of sensors 6 which supplies the risk matrix 2 with all temporary risk elements which can be reasonably detected. This sensor package 6 is connected to the risk decoder via a plug-in cable connection and is attached to a suitable outer location of the vehicle or is fixedly installed in the vehicle.

Furthermore, the risk decoder 1 is connected at the input end to regional servers 7 of an entire territorial server network for the duration of the travel through the region of the corresponding server. The servers 7 each make available to the risk matrix 2 supplementary permanent and/or temporary risk elements. The servers 7 are viewed as regional institutions, which update the raster of their area of responsibility within a circle of approximately 150 km to the newest state of information and have the same available.

The server 7 can supply such permanent risk elements which are not contained in the input matrix 5 or which no longer correspond to the current state. For example, such risk elements are construction sites, traffic jams or recent accident sites. The server can, however, also make available such temporary risk elements, which are difficult to detect with measuring technology, such as locally occurring fog or a coating of ice on the roadway. The regional server 7 can input these supplementary permanent and temporary risk elements directly into the risk matrix 2 of the passing motor vehicle or can feed the same into the risk matrix 2 via the input matrix 5. In those cases wherein a superposed information announcement from the server 7 and the sensor package 6 or the input matrix 5 occurs as to a specific risk element, the announcement of the sensor package 6 or the input matrix S is blocked and only the announcement of the server 7 is processed.

The server 7 and/or the input matrix 5 continue to announce to the risk matrix 2 all the speed limits which result from the traffic regulations.

The risk decoder 1 continues to be connected at its input end to the speed sensor 8 of the vehicle and this speed sensor continuously feeds the actual speed of the motor vehicle into the risk matrix 2. Alternatively, the actual speed can also be determined via the input matrix 5 and be made available to the risk matrix 2.

Finally, the risk decoder 1 has a manual input unit 9 at the input end. With a manual input, the operator 4 is supplied with the accident statistic standard matrix and with the individual risk elements for further transmission to the risk matrix 2.

At the output end, the risk decoder 1 has a display 10 which displays the determined risk class to the vehicle driver. Alternatively thereto, the risk decoder 1 can be connected directly to a risk unit 11 which balances the determined risk class with the pregiven intermediate or previously freely selected risk class and automatically controls the speed of the vehicle to the selected risk class. For this purpose, the risk unit 11 is fixedly connected to the drive system and the brake system of the vehicle.

The risk matrix 2 of the risk decoder 1 is loaded with an accident statistic standard matrix which can include, for example, nineteen selected permanent and temporary risk elements, seven different element groups of risk elements and three selected speed classes.

In the starting position, the risk decoder 1 automatically adjusts to an intermediate risk class which lies in a range extending from a risk class 1 having a very low risk and, for example, a risk class 5 having a very high risk. Before the start of a trip, the vehicle driver inputs his or her individual risk factors via the input unit 9 which concern essentially particulars as to driving practice. The vehicle driver has only to input whether he or she has a standard operator's license or a learner's permit. The driver of the vehicle corrects this intermediate risk class upwardly or downwardly based on his or her current physical and mental condition and thereby sets a lower or higher risk class. This pregiven intermediate or freely selected risk class is taken as the desired quantity for the intended trip.

In advance of the trip, the driver sets the intended trip route in the input matrix 5 in a manner analog to the conventional autonavigation system. If the input matrix 5 is coupled to a conventional satellite navigation system, then the adjustment of the trip route takes place synchronously and with topographical congruence. During the trip, the speed sensor 8 of the vehicle or the input matrix 5 determines the actual speed of the vehicle and transmits this value to the risk matrix 2. From this speed, the risk matrix 2 then computes, in each case, the length of the next trip segment of the intended trip route and this next trip segment is dimensioned shorter for lower speed and dimensioned longer for higher speed. The dimensioning of the trip segments takes place uninterruptedly during the trip. The lengths of the trip segments are different in size in correspondence to the speed of the vehicle. In each case, the currently dimensioned trip segment is transmitted to the input matrix 5. The input matrix 5 downloads the dimensioned trip segment together with the entered permanent risk elements and the entered speed limits and transmits the dimensioned trip segment with this information back to the risk matrix 2. At the same time, the sensor package 6 determines the temporary risk elements of the trip segment and transmits them likewise to the risk matrix 2. When the vehicle passes the territorial area of competency of the next central server 7, then the central server 7 updates all entered data as to permanent and temporary risk elements as well as the speed limits in the input matrix 5. After a longer stop in a territorial area of competency of a central server 7, the central server updates the data in the input matrix 5 when there is a renewed start of the motor of the vehicle. The risk matrix 2 compares the current speed to the now applicable speed limit and places the actual speed into one of the three speed classes. The risk matrix 2 continues to classify the detected risk elements into element groups as they result from the accident statistic standard matrix. From the risk elements, the element groups and the speed class, the risk matrix 2 then determines a special risk factor for each detected risk element in comparison to the accident statistic standard matrix. From the sum of the special risk factors of all occurring risk elements, an integral risk potential is computed for the trip segment, which is just then being traveled over, and this risk potential is expressed as a risk class.

The risk class so determined is an actual quantity and is compared to the risk class inputted as a desired quantity at the start of the trip. A warning announcement appears on the display 10 when the desired quantity is exceeded so that the driver of the vehicle receives a clear indication to reduce the speed. Alternatively, the risk unit 11 receives a corresponding actuating command from the desired quantity being exceeded for a direct intervention into the drive system and brake system of the vehicle.

It is understood that the foregoing description is that of the preferred embodiments of the invention and that various changes and modifications may be made thereto without departing from the spirit and scope of the invention as defined in the appended claims.

What is claimed is:

1. A method for controlling the speed of a vehicle in accordance with risk, the method comprising the steps of:
   computing a pregiven trip route for said vehicle which includes a plurality of speed-dependent trip segments;
   detecting the instantaneous speed of said vehicle;
   detecting risk elements during the trip for each one of said trip segments;
   computing the current one of said speed-dependent trip segments from said trip route;
   evaluating each one of said determined risk elements of said one speed-dependent trip segment as to the specific risk potential of said one risk element while considering the dangers thereof and said instantaneous speed of said vehicle;
   computing an integral risk potential for said one speed-dependent trip segment from a sum of the specific risk potentials of all of the detected risk elements for said one speed-dependent trip segment; and,
   utilizing said integral risk potential as a basis for changing the speed of said vehicle.

2. The method of claim 1, the method comprising the further steps of:
   grouping said risk elements into a first group defining permanent risk elements arid into a second group defining temporary risk elements wherein said permanent risk elements include at least one of the following: curves, uphill inclines, roadway exits, trees, poles, posted poor road locations, local locations whereat accidents are likely to occur, road surface defects, construction sites, wild animal road crossings and right-of-way signs and wherein said temporary risk elements include at least one of the following: darkness, wetness, ice, wind, fog, pedestrians, bicycle riders, motorcycles, oncoming vehicles and vehicles sharing the roadway and driving in the same direction; and,
   providing an input matrix and a regional server for making said permanent risk elements available;
   providing a packet of sensors; and,
   determining said temporary risk elements from said packet of sensors and said server.

3. The method of claim 1, wherein said method comprises the further step of computing each of said trip segments in accordance with the actual speed of the vehicle with the trip segment being longer with higher speed.

4. The method of claim 3, comprising the further steps of: providing an input matrix; taking up said one of said speed-dependent trip segments into said input matrix; and, limiting said risk elements to this trip segment.

5. The method of claim 1, wherein the evaluation of the specific risk potential of each of the detected risk elements takes place in the context of a comparison to an empirically determined accident statistic standard matrix in that the current speed of the vehicle is classified into predetermined speed classes and each detected risk element is classified into element groups.

6. The method of claim 5, wherein three speed classes are formed; the first one of said speed classes is for start-to-drive, turning, stopping and parking; the second one of said speed classes is for the permitted speed; and, the third one of said classes is for an impermissible speed.

7. The method of claim 6, wherein said three speed classes are further subdivided by element quantities.

8. The method of claim 1, wherein said integral risk potential of said trip segment is defined in empirically determined risk classes ranging from very low to very high and the risk classes determined in this manner are compared to a previously determined risk class.

9. The method of claim 8, wherein the predetermined risk class is determined while considering individual risk elements.

10. The method of claim 9, wherein said individual risk elements include the driving practice of the vehicle driver or the current psychosomatic state of the vehicle driver.

11. A system for carrying out a method for controlling the speed of a vehicle in accordance with risk with the method including the steps of: computing a pregiven trip route for said vehicle which includes a plurality of speed-dependent trip segments; detecting the instantaneous speed of said vehicle; detecting risk elements during the trip for each one of said trip segments; computing the current one of said speed-dependent trip segments from said trip route; evaluating each one of said determined risk elements of said one speed-dependent trip segment as to the specific risk potential of said one risk element while considering the dangers thereof and said instantaneous speed of said vehicle; computing an, integral risk potential for said one speed-dependent trip segment from a sum of the specific risk potentials of all of the detected risk elements for said one speed-dependent trip segment; utilizing said integral risk potential as a basis for changing the speed of said vehicle; and, said risk elements being grouped into a first group defining permanent risk elements and into a second group defining temporary risk elements; the system comprising;
   an input matrix wherein said permanent risk elements are stored and/or a sensor package for detecting said temporary risk elements from the environment and from typical traffic situations;
   a risk decoder for processing quantities of information;
   a display for indicating the detected risk elements;
   said risk decoder defining a computation module and including a risk matrix and a storage module;
   said risk matrix functioning to compute one of said speed-dependent trip segments and to compute an integral risk potential for said one trip segment in said risk decoder and wherein the computation of said integral risk potential takes place in comparison with a stored accident statistic standard matrix in that the special risk potential of each risk element is first investigated and the integral risk potential is determined therefrom.

12. The system of claim 11, wherein said risk matrix has an input end and said system coacts with a regional server connected to said input end of said risk matrix; and, said server supplies additional permanent and/or temporary risk elements and posted speed limits of said trip segment to said input matrix and to said sensor package.

13. The system of claim 12, said risk decoder including an operator and a manual input unit and said risk matrix being connected to said manual input unit via said operator for at least one individual risk element.

14. The system of claim 11, wherein said risk matrix has an output end alternatively connected to said display and a risk unit; and, said risk unit is connected directly into the drive system and brake system of said vehicle.

* * * * *

UNITED STATES PATENT AND TRADEMARK OFFICE
CERTIFICATE OF CORRECTION

PATENT NO. : 7,167,787 B2
APPLICATION NO. : 11/236538
DATED : January 23, 2007
INVENTOR(S) : Dieter Bastian and Ralf Eisenreich It is certified that error appears in the above-identified patent and that said Letters Patent is hereby corrected as shown below:

In column 5:
Line 41: delete "S" and substitute -- 5 -- therefor.

In column 7:
Line 31: delete "arid" and substitute -- and -- therefor.

In column 8:
Line 26: delete "an," and substitute -- an -- therefor.

Signed and Sealed this

Twelfth Day of June, 2007

JON W. DUDAS
*Director of the United States Patent and Trademark Office*